United States Patent
Ramirez Llanos et al.

(10) Patent No.: US 11,915,488 B2
(45) Date of Patent: Feb. 27, 2024

(54) AUTOMOTIVE LOCALIZATION AND MAPPING IN LOW-LIGHT ENVIRONMENT

(71) Applicant: Continental Automotive Systems, Inc., Auburn Hills, MI (US)

(72) Inventors: Eduardo Jose Ramirez Llanos, Rochester, MI (US); Andrew Phillip Bolduc, Rochester Hills, MI (US); Julien Ip, Madison Heights, MI (US); Dhiren Verma, Farmington Hills, MI (US); Xin Yu, Rochester Hills, MI (US)

(73) Assignee: Continental Autonomous Mobility US, LLC, Auburn Hills, MI (US)

(*) Notice: Subject to any disclaimer, the term of this patent is extended or adjusted under 35 U.S.C. 154(b) by 93 days.

(21) Appl. No.: 17/305,261

(22) Filed: Jul. 2, 2021

(65) Prior Publication Data
US 2023/0004743 A1    Jan. 5, 2023

(51) Int. Cl.
*G06V 20/56* (2022.01)
*G06T 7/187* (2017.01)
*G06T 5/50* (2006.01)

(52) U.S. Cl.
CPC ............... *G06V 20/56* (2022.01); *G06T 5/50* (2013.01); *G06T 7/187* (2017.01); *G06T 2207/10044* (2013.01); *G06T 2207/10132* (2013.01); *G06T 2207/20084* (2013.01); *G06T 2207/30252* (2013.01)

(58) Field of Classification Search
CPC .......... G06V 20/56; G06V 10/82; G06T 5/50; G06T 7/187; G06T 2207/10044; G06T 2207/10132; G06T 2207/20084; G06T 2207/30252; G01C 21/3602; G01C 21/28
See application file for complete search history.

(56) References Cited

U.S. PATENT DOCUMENTS

| | | | |
|---|---|---|---|
| 11,577,722 B1* | 2/2023 | Packer | G06V 10/82 |
| 2018/0081053 A1* | 3/2018 | Melvin | G01S 17/931 |
| 2020/0232801 A1* | 7/2020 | Kim | G01C 21/3848 |
| 2020/0309541 A1* | 10/2020 | Lavy | G06V 20/588 |
| 2021/0190507 A1* | 6/2021 | Terani | G06F 18/251 |
| 2021/0201070 A1* | 7/2021 | Omari | G01C 21/3635 |
| 2022/0020131 A1* | 1/2022 | Metzler | G06T 5/50 |

OTHER PUBLICATIONS

Localization for Autonomous Driving—2019 (Year: 2019).*
The International Search Report and the Written Opinion of the International Searching Authority dated Nov. 17, 2022 for the counterpart PCT Application No. PCT/US2022/073302.
Anoosheh Asha et al., "Night-to-Day Imagine Translation for Retrieval-based Localization", IEEE 2019 International Conference on Robotics and Automation (ICRA), May 20, 2019, pp. 5958-5964.

* cited by examiner

*Primary Examiner* — Nizar N Sivji
(74) *Attorney, Agent, or Firm* — William F. Esser

(57) ABSTRACT

A localization and mapping system and method for a motor vehicle is disclosed and includes at least one camera configured to obtain images of an environment surrounding the motor vehicle, at least one sensor configured to obtain location information for objects surrounding the motor vehicle and a controller configured to receive the images captured by the at least one camera and the location information obtained by the at least one sensor. The controller enhances the captured images utilizing a neural network and combines the enhanced images with the location information to localize the vehicle within the mapped environment.

19 Claims, 4 Drawing Sheets

AUTOMOTIVE LOCALIZATION AND MAPPING IN LOW-LIGHT ENVIRONMENT

TECHNICAL FIELD

The present disclosure relates to a system and method for localizing and mapping an environment surrounding a vehicle.

BACKGROUND

Autonomous and semi-autonomous vehicles continually gather and update information to determine vehicle position and orientation. In some instances, the vehicle is operated in unfamiliar, unknown and low-light environments. An unknown, low-light environment presents challenges to vehicle sensors and localization algorithms. Images taken in low-light environments may not provide a clear picture of the surrounding environment that is useful for locating and orientating a vehicle.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A localization and mapping system for a motor vehicle according to a disclosed example embodiment includes, among other possible things, at least one camera configured to obtain images of an environment surrounding the motor vehicle, at least one sensor configured to obtain location information for objects surrounding the motor vehicle and a controller configured to receive the images captured by the at least one camera and the location information obtained by the at least one sensor, to enhance the captured images utilizing a neural network to produce an enhanced image, combine the enhanced images with the location information and localize the vehicle based on the combined enhanced images and location information.

In another exemplary embodiment of the foregoing localization and mapping system the neural network comprises a database with low-light images and corresponding ground truth images.

In another exemplary embodiment of any of the foregoing localization and mapping systems the controller is configured to apply a weighting factor to a loss function applied to a sequence of images for enhancing the images.

In another exemplary embodiment of any of the foregoing localization and mapping systems, the weighting factor is applied to a pixel-wise mean squared error loss for enhancement of the captured images.

In another exemplary embodiment of any of the foregoing localization and mapping systems, the weighting factor is biased toward application of enhancements based on more recent comparisons between captured images and a ground truth image.

In another exemplary embodiment of any of the foregoing localization and mapping systems, an output enhanced image is combined with the localization information to generate a map of an environment surrounding the motor vehicle.

In another exemplary embodiment of any of the foregoing localization and mapping systems, the at least one sensor comprises at least one radar sensing device mounted on the motor vehicle.

In another exemplary embodiment of any of the foregoing localization and mapping systems, the at least one sensor comprises at least one ultrasonic sensor mounted on the vehicle.

Another exemplary embodiment of any of the foregoing localization and mapping systems further includes at least one sensor generating information regarding a vehicle operating parameter and the controller is further configured to combine information regarding the vehicle operating parameters and the enhanced images to localize the vehicle.

In another exemplary embodiment of any of the foregoing localization and mapping systems, the controller is configured to implement a simultaneous localization and mapping algorithm utilizing the enhanced images, information on the location of objects surrounding the vehicle and information regarding vehicle operating parameters to localize and map an environment around the motor vehicle.

A method for localization and mapping for a vehicle in a low-light environment according to another disclosed example embodiment includes, among other possible things, obtaining a sequence of images of an environment surrounding a vehicle, enhancing low-light images with a low-light image enhancement model to generate a sequence of enhanced images, and generating a map of an environment surrounding the vehicle based on the sequence of enhanced images.

Another example embodiment of the foregoing method further includes generating the low-light image enhancement model for enhancing low-light images with neural network receiving comparing low-light images and ground truth images.

Another example embodiment of any of the foregoing methods further includes applying a weight factor that biases application of correction factors to those formed from more current images.

In another example embodiment of any of the foregoing methods, the weight factor applies more importance to current images and disregards past images.

Another example embodiment of any of the foregoing methods further includes obtaining information from at least one sensor configured to obtain location information for objects surrounding the motor vehicle and combining the location information with the enhanced images to generate the map of the environment surrounding the vehicle.

Another example embodiment of any of the foregoing methods further includes receiving at least one sensor generating information regarding a vehicle operating parameter and combining information regarding the vehicle operating parameters and the enhanced images to localize the vehicle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
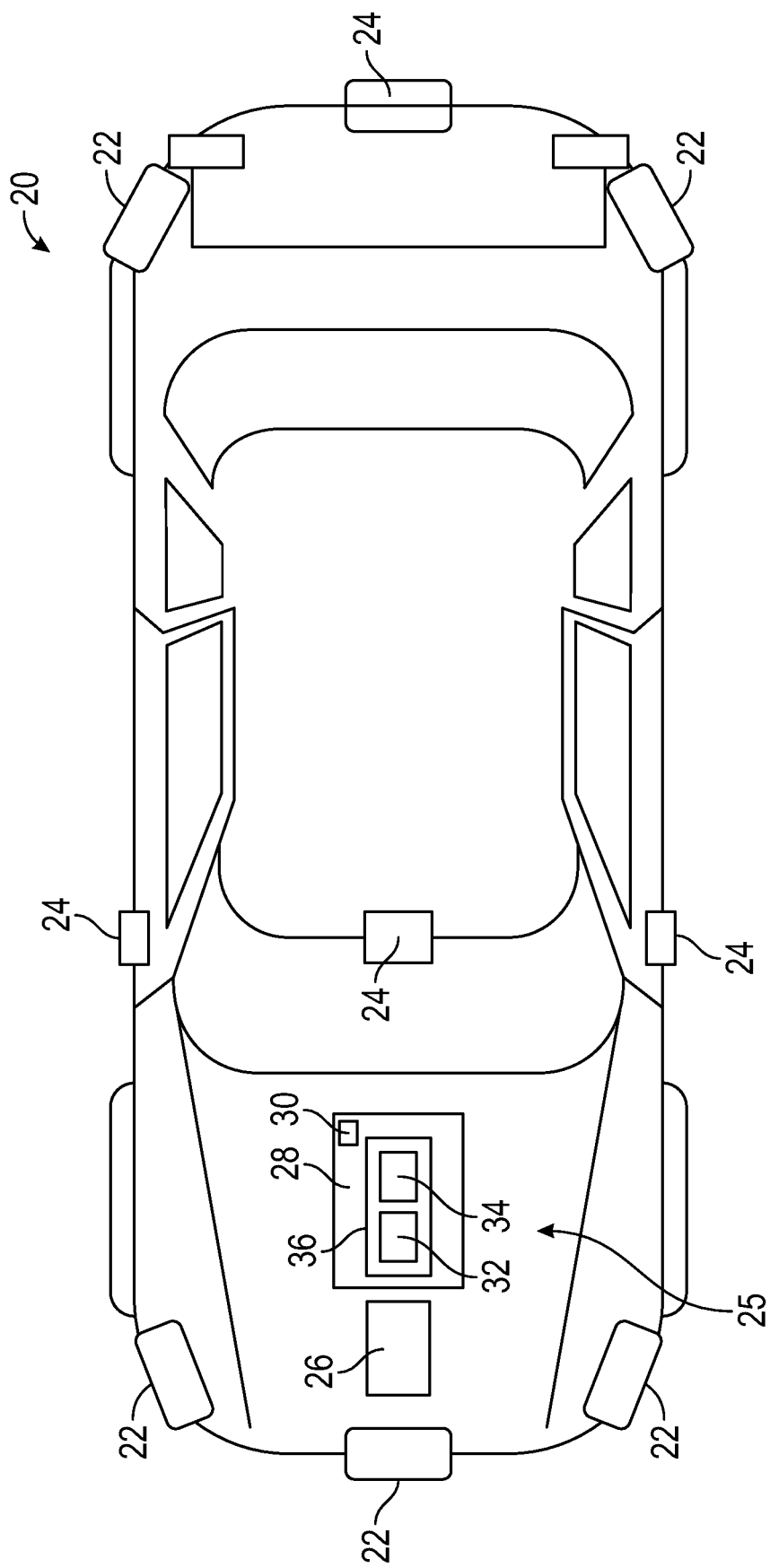
FIG. 1 is a schematic representation of a vehicle with a localization and mapping system.

Referring to FIG. 1, a vehicle 20 is shown schematically and includes a system 25 for localizing and mapping the surrounding environment and the vehicles position and orientation in that environment. Vehicles include an increasing number of autonomous and/or semi-autonomous driver assist features. Driver assist features utilize environmental information to operate. The example disclosed system 25 embodiment enhances sequences of images obtained in low-light settings to provide useful information for localizing and mapping the environment surrounding the vehicle without significantly increasing required processing capabilities.

The example vehicle 20 includes cameras 24 and at least one other sensing device. In the disclosed example, the sensing device includes radar devices 22 that are disposed at different locations around the vehicle. The cameras 24 and radar devices 22 provide information to a controller 28. Although radar devices 22 are shown by way of example, other sensing devices may also be utilized within the contemplation and scope of this disclosure.

The images captured by the cameras 24 may not provide as much useful information as possible in low-light environments. The example controller 28 includes an algorithm that enhances captured low-light image sequences. The enhanced images are then utilized by location and mapping algorithms such as for example a simultaneous localization and mapping algorithm (SLAM) 34. The SLAM 34 uses the enhanced images to generate mapping information along with the information captured from other vehicle sensors and information gathering systems and devices.

The controller 28 may be a portion of an overall vehicle controller and/or a dedicated controller for the example system 25. The controller 28 is configured to process information received from the radar devices 22, cameras 24, global positioning system device 30 and information from various vehicle operating systems indicated schematically at 26 and determine a location and orientation of the vehicle 20 within the surrounding environment.

The SLAM 25 algorithm executed by the controller 28 of the vehicle 20. The controller 28 is schematically shown and includes at least a processing device and a memory device 36. The controller 28 may be a hardware device for executing software, particularly software stored in the memory 36. The processing device can be a custom made or commercially available processor, a central processing unit (CPU), an auxiliary processor among several processors associated with the computing device, a semiconductor based microprocessor (in the form of a microchip or chip set) or generally any device for executing software instructions.

The memory 36 can include any one or combination of volatile memory elements (e.g., random access memory (RAM, such as DRAM, SRAM, SDRAM, VRAM, etc.)) and/or nonvolatile memory elements. Moreover, the memory 36 may incorporate electronic, magnetic, optical, and/or other types of storage media. Note that the memory can also have a distributed architecture, where various components are situated remotely from one another, but can be accessed by the processor.

The software in the memory 36 may include one or more separate programs, each of which includes an ordered listing of executable instructions for implementing disclosed logical functions and operation. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Input/Output devices (not shown) that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

The controller 28 may control vehicle systems to either autonomously control the vehicle 20 or provide driver assist functions to aid an operator of the vehicle 20.

Figure 2:
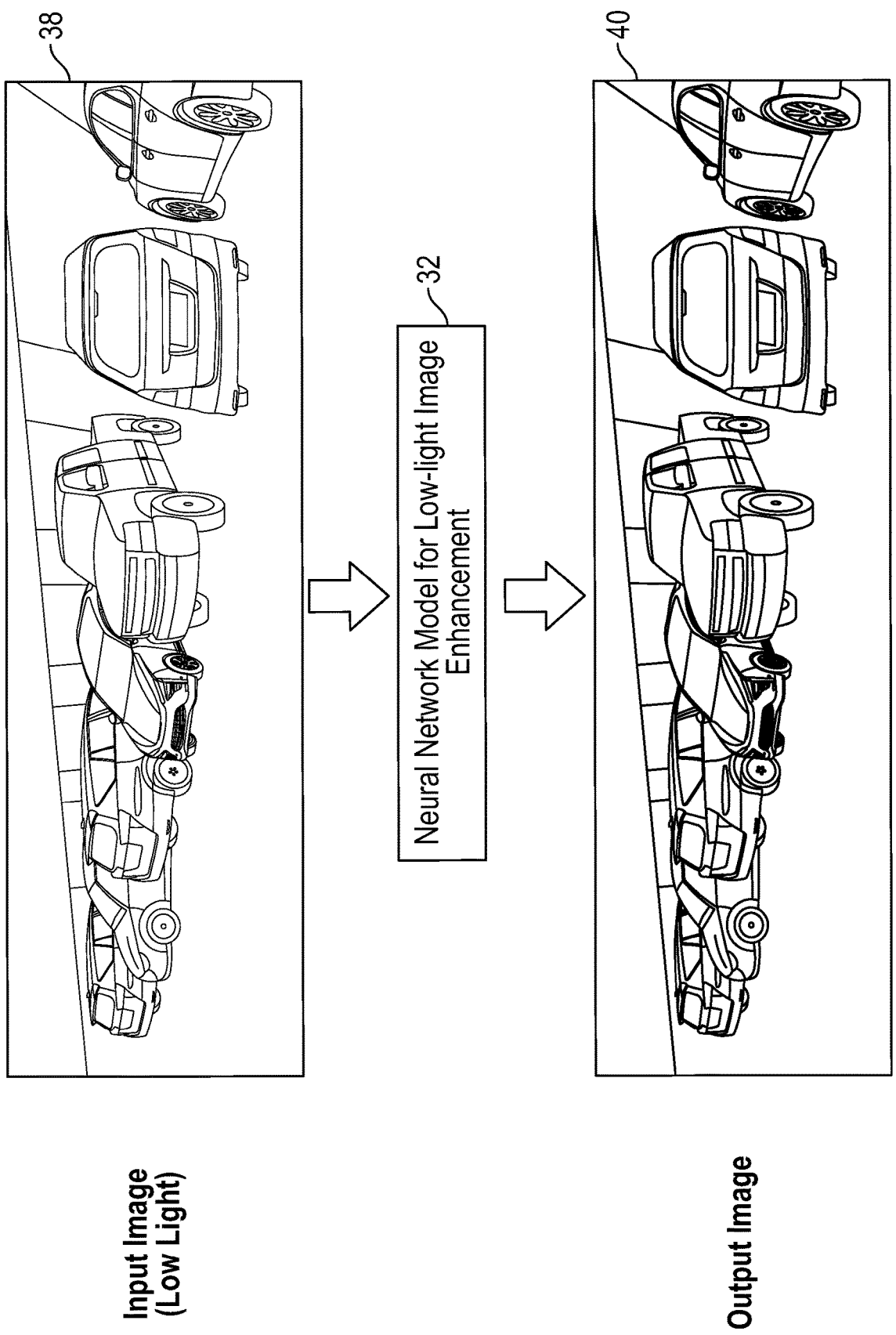
FIG. 2 is schematic view of captured input images and enhanced output images.

Referring to FIG. 2 with continued reference to FIG. 1, an example low-light images 38 is shown and input into a neural network model 32 for enhancement. The neural network model 32 utilizes visual enhancement techniques to adjust the image, pixel by pixel. The resulting output enhanced image 40 provides more contrast and clarity of the objects within the images and proximate the vehicle 20. The neural network model 32 is built utilizing past and current images along with corresponding ground truth images. The function and features required to enhance the low-light images are learned through the use of matched pairs of low-light and ground truth images and then applied to current images to obtain output enhanced images.

Figure 3:
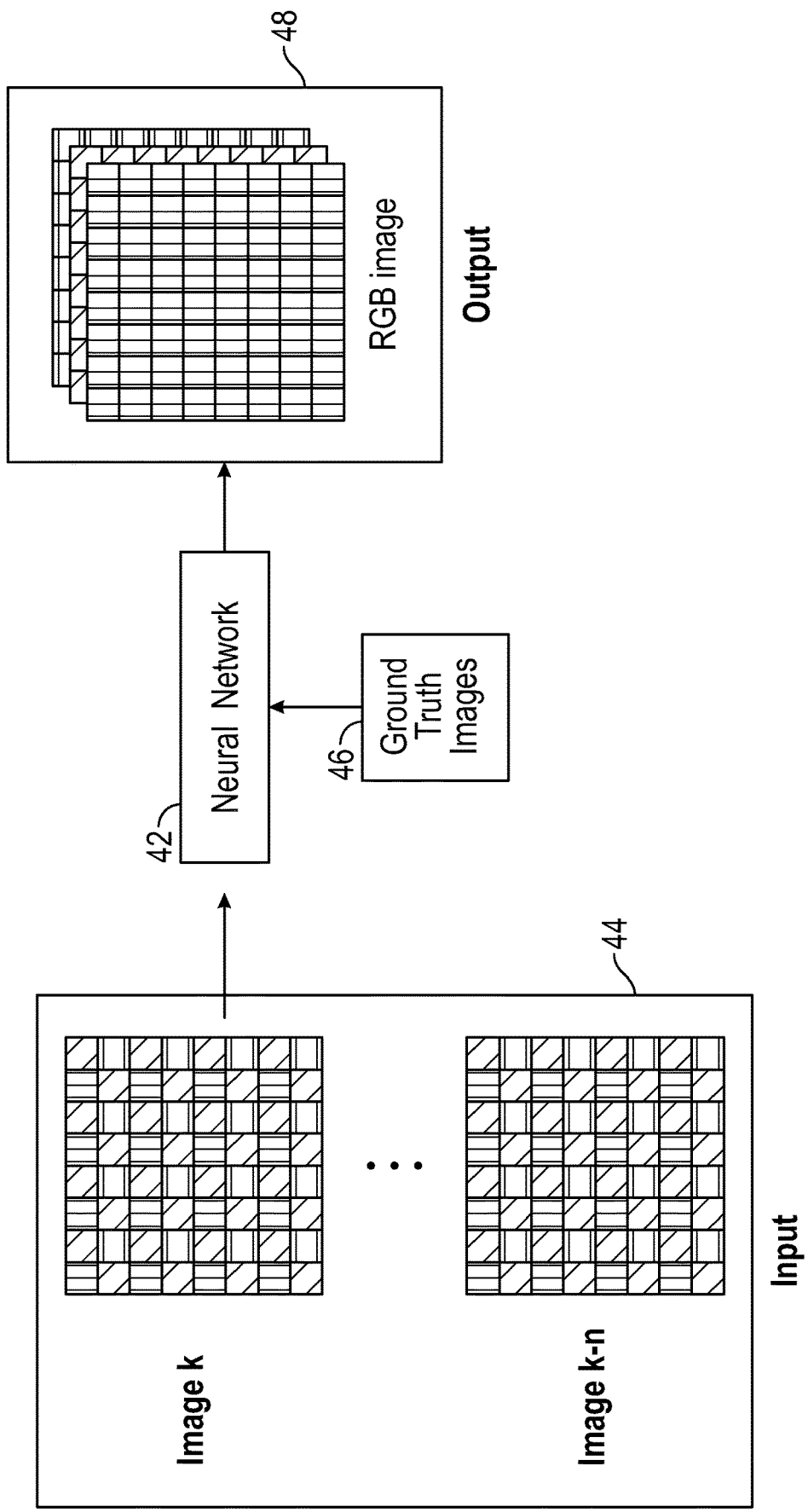
FIG. 3 is a schematic diagram illustrating enhancement of input images with a neural network.

Referring to FIG. 3, with continued reference to FIGS. 1 and 2, a convolutional neural network 42 is used to generate the model 32 for enhancement of the captured low-light images. The input into the convolutional neural network 42 includes matched pairs of low-light images 44 and ground truth images 46. The disclosed image enhancement operates according to the following terms:

$$L_{total}^k = L_{MSE}^k + \alpha L_c^k$$

In the above equation, $L_{total}$ is the loss function to be minimized by the convolutional neural network. The term is the pixel-wise mean squared error loss that is utilized for image enhancement. It minimizes the error between the training data (e.g., low-light image) and the ground truth. This term is given by $$L_{MSE}^k = \frac{1}{WH} \sum_{x=1}^{W} \sum_{y=1}^{H} (I_{x,y}^{k,G} - I_{x,y}^k)^2.$$

In the above equation, W and H are the width and height of the input images. $I_{x,y}^k$ $I_{x,y}^{k,G}$ and are the pixel value of the output image and the ground truth images at time k. The term $L_c^k$ is the loss function that captures higher level features to improve the quality of the prediction, which is given by $$L_c^k = \frac{1}{W_\phi H_\phi} \sum_{x=1}^{W_\phi} \sum_{y=1}^{H_\phi} \left( \phi(I^{k,G})_{x,y} - \phi(I^k)_{x,y} \right)^2,$$

where $\phi$ is the feature map produced by a convolutional layer, $W_\phi$ and $H_\phi$ are the width and height of the feature map for a given image $I^k$. Notice that the term $L_c^k$ penalizes the error in regions instead of penalizing the error in pixels as done by the term $L_{MSE}^k$.

The loss function above does not weight any of the images. The disclosed example enhancement weights the images according to the below equation.

$$L = \sum_{k=1}^{k-n} w_k \left( L_{MSE}^k + aL_c^k \right) = \sum_{k=1}^{k-n} w_k L_{total}^k$$

The Lisa weighted sum of $L_{total}^k$ over the last number of images n. The weighted sum of the last number of images smooths out variations in pixel intensities for the sequence of images from k to k-n. The weight factor $w_k$ is a scaler value chosen to give more importance to current images and to disregard much older images. The weighting of more current images and the disregard and/or disposal of older images reduces the processor system requirements and thereby costs.

Figure 4:
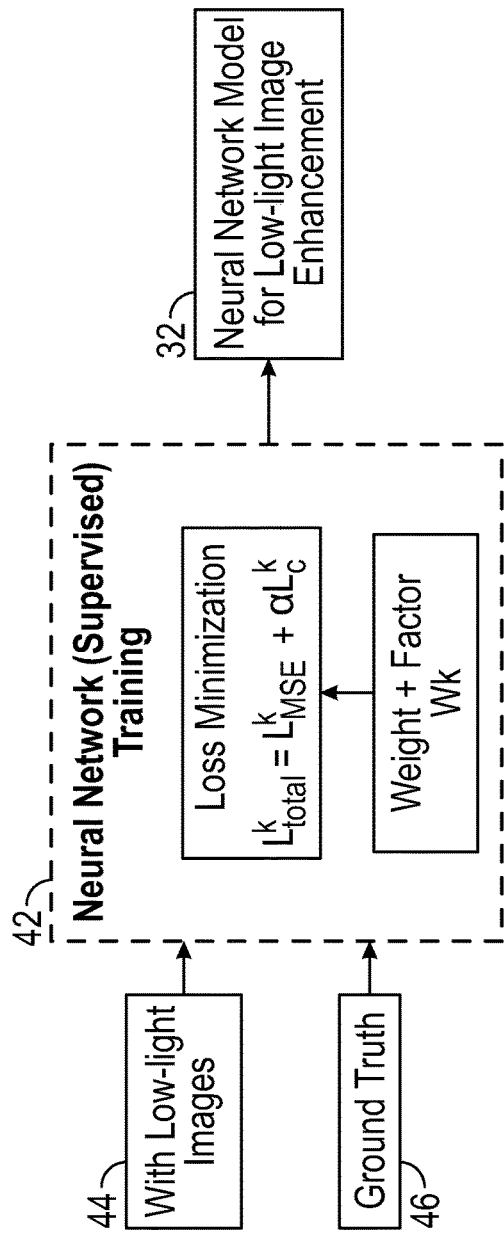
FIG. 4 is a flow diagram of an example method of generating a model for enhancing low-light images.

Referring to FIG. 4 with continued reference to FIGS. 1-3, generation of the neural network model 32 is schematically shown. Low-light images 44 and corresponding ground truth images 46 are input into the convolutional neural network 42 for training and development of the neural network model for low-light image enhancement shown at 32. The convolutional neural network applies the lost function along with the weight factor to continually update and improve the model 32. The continual improvement of the model may occur during an initial training process and continue throughout operation of the vehicle.

Figure 5:
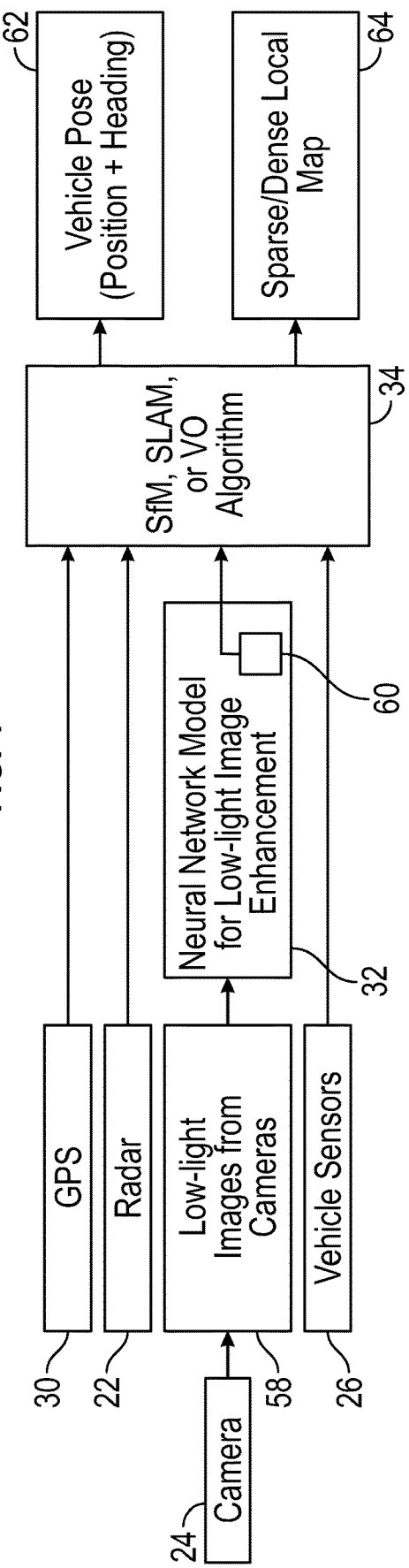
FIG. 5 is a flow diagram of an example method of localizing and mapping an environment surrounding a vehicle utilizing an enhanced sequence of images.

Referring to FIG. 5 with continued reference to FIG. 4, the example disclosed method fuses images from the cameras 24 with information from the GPS 30, radar devise and vehicle sensors 26 to generate and localize the vehicle 20 in a self-generated map. During low-light conditions, low-light images 58 from the cameras 24 are processed through the neural network model 32 to produce enhanced images 60. The enhanced images 60 are communicated to the SLAM algorithm 34 for generation of the localized map 64 and an orientation and position of the vehicle within that map 64 as indicated at 62. The vehicle orientation and position and heading along with any other positional and dynamic vehicle directional information needed for navigation and operation of driver assist features.

Accordingly, the disclosed example localization and mapping system enhances low-light images to improve useful information to orientate and position a vehicle in unfamiliar, low-light environments.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A localization and mapping system for a motor vehicle comprising:
   at least one camera configured to obtain images of an environment surrounding the motor vehicle;
   at least one sensor configured to obtain location information for objects surrounding the motor vehicle; and
   a controller, comprising at least one processor circuit and memory coupled to the at least one processor circuit, configured to receive the images captured by the at least one camera and the location information obtained by the at least one sensor, enhance the captured images utilizing a neural network model to produce enhanced images, combine the enhanced images with the location information and localize the vehicle based on the combined enhanced images and location information, and perform at least one autonomous or semi-autonomous function based in part upon the vehicle localization,
   wherein the controller is further configured to apply a weighting factor to a loss function applied to a sequence of the captured images for enhancing the captured images, the weighting factor being applied to a pixel-wise mean squared error loss for enhancing the captured images.

2. The localization and mapping system as recited in claim 1, further comprising a neural network which generated the neural network model, wherein the neural network comprises a database with low-light images and corresponding ground truth images.

3. The localization and mapping system as recited in claim 1, wherein the weighting factor is biased toward application of enhancements based on more recent comparisons between captured images and a ground truth image.

4. The localization and mapping system as recited in claim 1, wherein the enhanced images are combined with the location information to generate a map of an environment surrounding the motor vehicle.

5. The localization and mapping system as recited in claim 1, wherein the at least one sensor comprises at least one radar sensing device mounted on the motor vehicle.

6. The localization and mapping system as recited in claim 1, wherein the at least one sensor comprises at least one ultrasonic sensor mounted on the vehicle.

7. The localization and mapping system as recited in claim 1, including at least one sensor generating information regarding a vehicle operating parameter and the controller is further configured to combine information regarding the vehicle operating parameters and the enhanced images to localize the vehicle.

8. The localization and mapping system as recited in claim 7, wherein the controller is configured to implement a simultaneous localization and mapping algorithm utilizing the enhanced images, information on the location of objects surrounding the vehicle and information regarding vehicle operating parameters to localize and map an environment around the motor vehicle.

9. A localization and mapping method for a vehicle in a low-light environment, the method comprising:
- obtaining, by a controller including at least one processor circuit, a sequence of images of an environment surrounding a vehicle;
- enhancing, by the controller, low-light images with a low-light image enhancement model to generate a sequence of enhanced images; and
- generating, by the controller, a map of an environment surrounding the vehicle based on the sequence of enhanced images; and
- performing, by the controller, at least one autonomous or semi-autonomous operation using the generated map,
- wherein the generating the low-light image enhancement model further comprises applying a weight factor that biases application of correction factors to those formed from more current images.

10. The method as recited in claim 9, further comprising generating, with a neural network, the low-light image enhancement model for enhancing low-light images with a neural network receiving and comparing low-light images and ground truth images.

11. The method as recited in claim 9, wherein the weight factor applies more importance to current images and disregards past images.

12. The method as recited in claim 9, further comprising obtaining, by the controller, information from at least one sensor configured to obtain location information for objects surrounding the motor vehicle and combining the location information with the enhanced images to generate the map of the environment surrounding the vehicle.

13. The method as recited in claim 12, further comprising receiving, by the controller, at least one sensor generating information regarding a vehicle operating parameter and combining information regarding the vehicle operating parameters and the enhanced images to localize the vehicle.

14. A method for controlling a vehicle, comprising:
- training a neural network by
  - receiving, by the neural network, low-light images and ground truth images,
  - applying, with the neural network, a loss function L to the low-light images and the ground truth images, the loss function L comprising a pixel-wise mean squared error loss $L_{MSE}^k$, a loss function $L_c^k$, and a weighting factor applied to the pixel-wise mean squared error loss $L_{MSE}^k$ and the loss function $L_c^k$, and
  - generating, by the neural network, a low-light image enhancement model based on the applied loss function L to the low-light images and the ground truth images;
- receiving, by a controller comprising at least one processor circuit and memory coupled thereto, a sequence of images of an environment surrounding a vehicle;
- receiving, by the controller, location information of objects surrounding the vehicle from at least one sensor;
- enhancing, by the controller, the sequence of images with the low-light image enhancement model to generate a sequence of enhanced images;
- combining, by the controller, the sequence of enhanced images with the location information and localizing the vehicle by the controller based on the combination; and
- performing, by the controller, at least part of at least one autonomous or semi-autonomous operation based in part upon the vehicle localization.

15. The method of claim 14, wherein the loss function L is defined by $$L = \sum_{k=1}^{k-n} w_k \left( L_{MSE}^k + \alpha L_c^k \right) = \sum_{k=1}^{k-n} w_k L_{total}^k$$

where k and n refer to the low-light images from time k to time k-n.

16. The method of claim 15, wherein the pixel-wise mean squared error loss $L_{MSE}^k$ is represented by $$L_{MSE}^k = \frac{1}{WH} \sum_{x=1}^{W} \sum_{y=1}^{H} \left( I_{x,y}^{k,G} - I_{x,y}^k \right)^2$$

where W and H are a width and a height, respectively, of the low-light images, $I_{x,y}^k$ and $I_{x,y}^{k,G}$ are pixel values of an output image and the ground truth images at time k, the pixel-wise mean squared error loss L penalizes error in pixels of the low-light images.

17. The method of claim 15, wherein the loss function $L_c^k$ is represented by $$L_c^k = \frac{1}{W_\phi H_\phi} \sum_{x=1}^{W_\phi} \sum_{y=1}^{H_\phi} \left( \phi(I^{k,G})_{x,y} - \phi(I^k)_{x,y} \right)^2$$

where $\phi$ is a feature map produced by a convolutional layer of the neural network, and $W_\phi$ and $H_\phi$ are a width and a height of the feature map for a given image $I^k$, the loss function $L_c^k$ penalizes error in regions of the low-light images.

18. The method of claim 14, wherein the weighting factor applies more importance to current images relative to images that are captured prior to the current images.

19. The method of claim 14, wherein the weighting factor is biased toward application of enhancements based on more recent comparisons between captured images and the ground truth image relative to comparisons between captured images and the ground truth images which occurred earlier.

* * * * *